(12) United States Patent
Sugden

(10) Patent No.: US 7,384,104 B2
(45) Date of Patent: Jun. 10, 2008

(54) OSCILLATING DISC CUTTER WITH SPEED CONTROLLING BEARINGS

(75) Inventor: David Burnet Sugden, Tasmania (AU)

(73) Assignee: Odyssey Technology Pty Ltd, Pinjarra Hills (AU)

( * ) Notice: Subject to any disclaimer, the term of this patent is extended or adjusted under 35 U.S.C. 154(b) by 0 days.

(21) Appl. No.: 10/511,895

(22) PCT Filed: Apr. 22, 2003

(86) PCT No.: PCT/AU03/00473

§ 371 (c)(1),
(2), (4) Date: Oct. 20, 2004

(87) PCT Pub. No.: WO03/089762

PCT Pub. Date: Oct. 30, 2003

(65) Prior Publication Data

US 2005/0140200 A1    Jun. 30, 2005

(30) Foreign Application Priority Data

Apr. 22, 2002    (AU) .................... PS1868

(51) Int. Cl.
*F16C 32/06*    (2006.01)
*E21C 25/18*    (2006.01)
(52) U.S. Cl. .............. 299/79.1; 188/290; 384/123
(58) Field of Classification Search ............ 188/290, 188/293, 294; 384/99–101, 121, 123; 299/79.1
See application file for complete search history.

(56) References Cited

U.S. PATENT DOCUMENTS

| 1,634,322 | A | | 7/1927 | Dornes, Jr. |
| 2,336,335 | A | | 12/1943 | Zublin |
| 3,332,726 | A | * | 7/1967 | Cooper .................. 384/101 |
| 3,429,390 | A | | 2/1969 | Bennett |
| 3,663,054 | A | | 5/1972 | Dubois |
| 4,005,905 | A | | 2/1977 | Dubois |

(Continued)

FOREIGN PATENT DOCUMENTS

AU    18912/70    2/1972

(Continued)

OTHER PUBLICATIONS

Stack B, "Encyclopedia of Mining, Tunnelling and Drilling Equipment", 11 pages, Muden Publishing Company, Hobart, undated.

(Continued)

*Primary Examiner*—Sunil Singh
(74) *Attorney, Agent, or Firm*—Nixon & Vanderhye P.C.

(57) ABSTRACT

An oscillating disc cutter including a cutting disc and a drive mechanism. The drive mechanism includes a drive shaft to effect eccentric oscillation of the cutting disc and a radial bearing disposed to permit relative rotation between the drive shaft and the cutting disc. The cutter further including a hydrostatic axial bearing disposed to react axial forces while accommodating induced rotation of the cutting disc when operatively engaged and to induce a rotational drag thereby limiting rotational peed of the cutting disc when free running. A water pressurized fluid bearing induces a predetermined axial load in the hydrostatic bearing such that a predetermined maximum running clearance in the hydrostatic bearing is maintained.

20 Claims, 7 Drawing Sheets

U.S. PATENT DOCUMENTS

| | | | |
|---|---|---|---|
| 4,096,917 A | 6/1978 | Harris | |
| 4,168,755 A | 9/1979 | Willis | |
| 4,169,629 A | 10/1979 | Legrand | |
| 4,245,939 A | 1/1981 | Sear | |
| 4,261,425 A | 4/1981 | Bodine | |
| 4,273,383 A | 6/1981 | Grisebach | |
| 4,295,690 A | 10/1981 | Rutz et al. | |
| 4,341,273 A | 7/1982 | Walker et al. | |
| 4,372,403 A | 2/1983 | Beeman | |
| 4,417,379 A | 11/1983 | Goode | |
| 4,527,637 A | 7/1985 | Bodine | |
| 4,796,713 A | 1/1989 | Bechem et al. | |
| 5,103,705 A | 4/1992 | Bechem | |
| 5,125,719 A | 6/1992 | Snyder | |
| 5,202,937 A * | 4/1993 | Arvidsson | 384/101 |
| 5,462,364 A | 10/1995 | Chandrasekaran | |
| 5,575,537 A | 11/1996 | Kogler et al. | |
| 6,062,650 A | 5/2000 | Smith et al. | |
| 6,076,895 A | 6/2000 | Ino et al. | |
| 6,357,831 B1 | 3/2002 | Stoebe | |
| 6,561,590 B2 | 5/2003 | Sugden | |

FOREIGN PATENT DOCUMENTS

| | | |
|---|---|---|
| AU | 41965/72 | 12/1973 |
| CA | 2080828 | 4/1991 |
| DE | 4332113 | 3/1995 |
| EP | 0 618 377 A | 10/1994 |
| EP | 0692 612 A1 | 1/1996 |
| EP | 727562 | 8/1996 |
| GB | 2 124 407 A | 2/1984 |
| GB | 2 136 479 A | 9/1984 |
| GB | 2 252 576 A | 8/1992 |
| RU | 581263 | 11/1977 |
| RU | 714008 | 2/1980 |
| RU | 1084-438 A | 1/1983 |
| RU | 1263841 | 10/1986 |
| WO | WO 91/18185 | 11/1991 |
| WO | WO 00/46486 | 8/2000 |

OTHER PUBLICATIONS

Referene Materials Describing and/or Showing Rolling Type Cutters and Other Cutter, 7 pages, undated.

Supplementary European Search Report for EP 03 71 7030, Completed Feb. 20, 2006, 2 pages.

* cited by examiner

OSCILLATING DISC CUTTER WITH SPEED CONTROLLING BEARINGS

CROSS REFERENCE TO PRIORITY APPLICATIONS

This application is the U.S. National Phase of International Application No. PCT/AU03/00473, filed in Australia on 22 Apr., 2003, which designated the U.S., and claims priority to Australian Application No. PS 1868, filed 22 Apr. 2002, each incorporated by reference in its entirety.

FIELD OF THE INVENTION

This invention relates to an oscillating disc cutter with speed controlling bearings and has been devised particularly though not solely to prevent high speed rotation of a disc cutter when the cutting disc is disengaged from a rock face.

BACKGROUND OF THE INVENTION

Oscillating disc cutters of the type described in international patent specification WO 00/46486 (the contents of which are incorporated herein by way of cross reference) have the general requirement that a mechanism is provided to prevent the cutting disc from rotating at a high speed when the cutter is not engaging the rock face. It should be noted that the reference to international patent specification WO 00/46486 is not an admission that this publication forms part of the common general knowledge in Australia or in any other territory.

In normal cutting mode, when the disc cutter is presented to the cutting face the disc naturally rotates at about 30-40 rpm in the opposite direction to the shaft due to the rubbing friction caused by displacement difference between the diameter of the cutting disc and oscillating path diameter. It will be appreciated that this low speed rotation in the cutting mode is advantageous because it provides for even wear of the cutting disc and prevents temperature build-up at one point on the cutter.

However, during free running mode, when the cutter is not in contact with the rock face, torque transmitted to the disc from the shaft through bearing 609 (shown in FIG. 7 of WO 00/46486 and reproduced here as FIG. 5), causes the disc cutter to rotate in the same direction as the shaft. Without some degree of control, the cutter would speed up to around the same speed as the shaft, i.e. around 3000 rpm.

Reapplying the cutter to the rock face causes an almost instantaneous acceleration of the disc from around 3000 rpm in one direction to around 30-40 rpm in the opposite direction. This can cause significant wear and damage to the cutting edge. In international patent specification WO 00/46486, a solution is proposed of using a gear arrangement shown generally 616 in FIG. 5, (FIG. 7 of that specification).

Such a gear arrangement is heavy, prone to wear, maintenance issues, and causes additional drag when the cutter is engaged with the rock face.

It is an object of the present invention to overcome or ameliorate at least one of the disadvantages of the prior art, or to provide a useful alternative.

SUMMARY OF THE INVENTION

Accordingly the present invention provides an oscillating disc cutter including a cutting disc and a drive mechanism, the drive mechanism including a drive shaft to effect eccentric oscillation of the cutting disc and a radial bearing disposed to permit relative rotation between the drive shaft and the cutting disc, the cutter further including a first axial bearing disposed to react axial forces while accommodating induced rotation of the cutting disc when operatively engaged and to induce a rotational drag thereby limiting rotational speed of the cutting disc when free running.

Preferably, the cutter further includes a second bearing to induce a predetermined axial load in the first bearing.

Preferably, the second bearing substantially reacts the axial forces induced by the first bearing.

Preferably, the first bearing is a oil operated hydrostatic bearing and the second bearing is a fluid pressurised and lubricated bearing.

Preferably, pressure in the fluid bearing is maintained at a level such that a predetermined maximum running clearance in the hydrostatic bearing is maintained thereby inducing shear forces in the oil of the hydrostatic bearing. Preferably, the shear forces cause rotational drag in the bearing thereby limiting the rotational speed of the cutting disc in when free running.

Preferably, the fluid bearing takes the form of a water-pressurised annulus.

Preferably, the limited rotational speed of the cutting disc is 0 to 100 rpm.

BRIEF DESCRIPTION OF THE DRAWINGS

Notwithstanding any other forms that may fall within its scope, one preferred form of the invention will now be described by way of example only with reference to the accompanying drawings in which.

DETAILED DESCRIPTION OF THE INVENTION

Figure 4A:
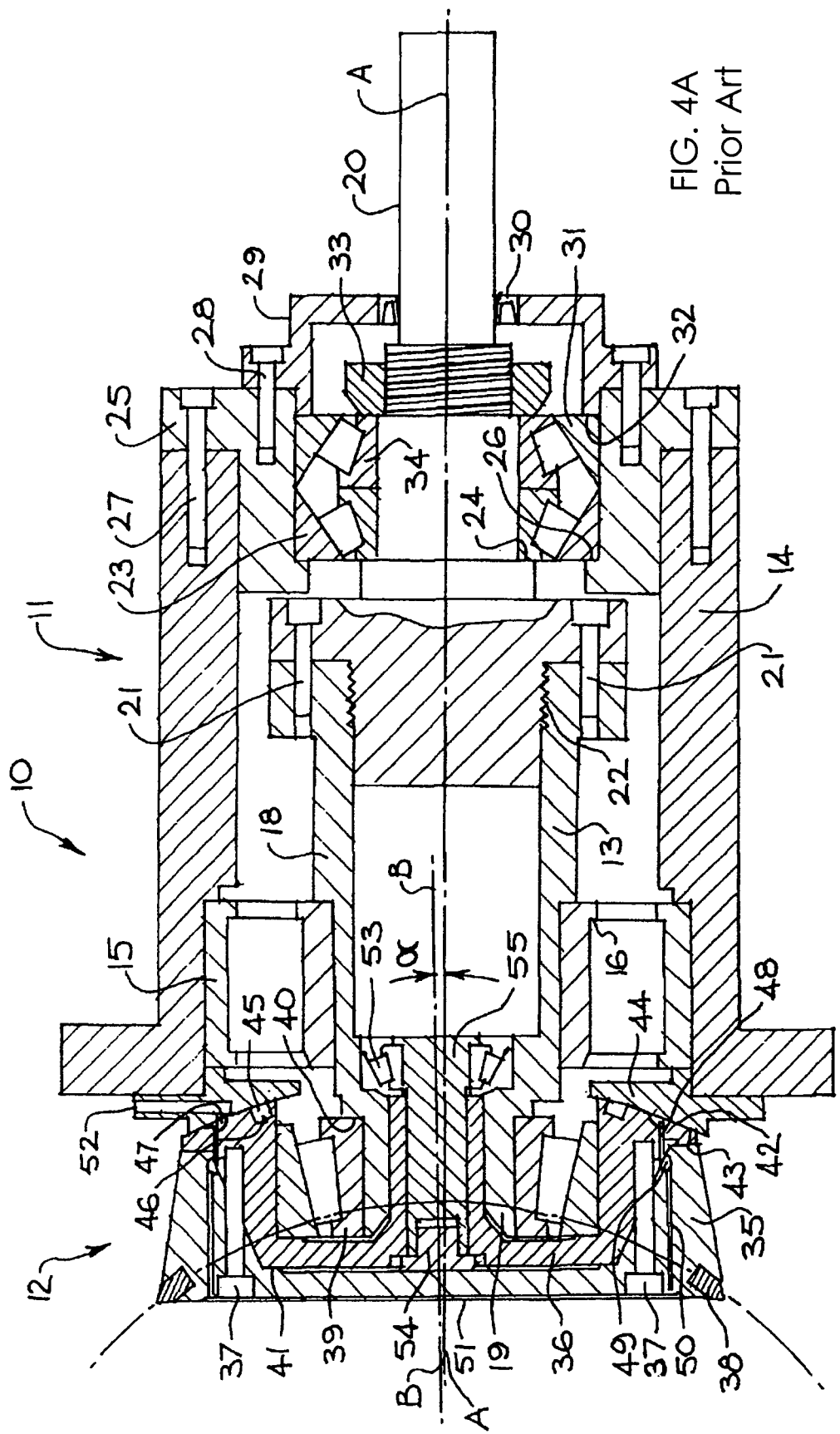
FIG. 4A is a reproduction of FIG. 1 from WO 00/46486 and shows a part cross-sectional view of an oscillating disc cutting device taken.

FIG. 4A is a cross-sectional view of an oscillating disc cutting device according to WO 00/46486. The cutting device 10 includes a mounting assembly 11 and a rotary disc cutter 12. The mounting assembly 11 includes a mounting shaft 13 which is rotatably mounted within a housing 14, that can constitute or be connected to a large mass for impact absorption. The housing 14 thus, can be formed of heavy metal or can be connected to a heavy metallic mass. The shaft 13 is mounted within the housing 14 by a bearing 15 mounted against a stepped section 16.

Figure 4B:
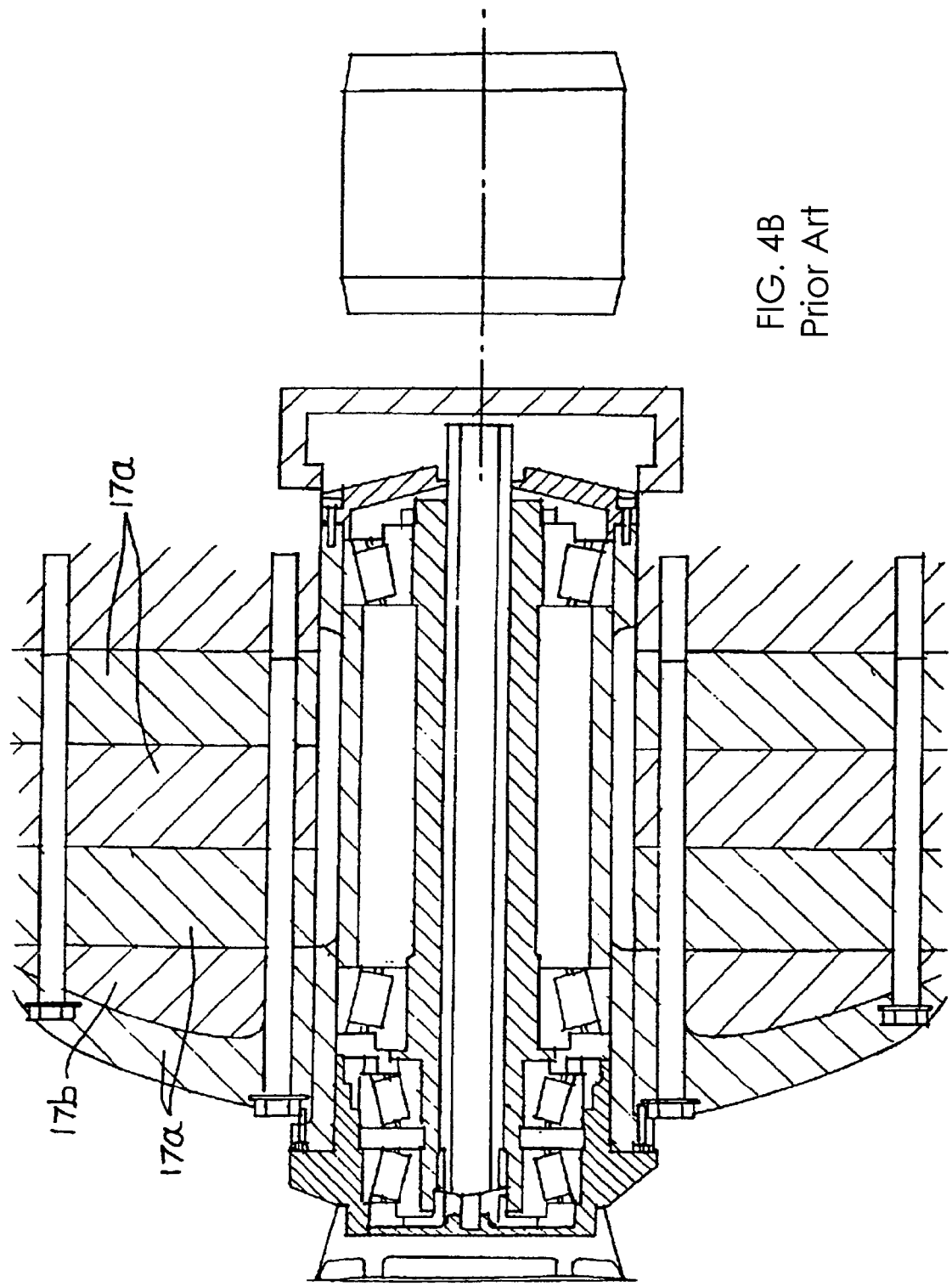
FIG. 4B is a reproduction of FIG. 2 from WO 00/46486 and is an enlarged view of the cutting device of FIG. 1.

The housing 14 can have any suitable construction, and in one form includes a plurality of metal plates fixed together longitudinally of the shaft 13. Such an arrangement is shown in FIG. 4B, and with this arrangement, applicant has found that a plurality of iron plates 17a and a single lead plate 17b provides effective impact absorption based on weight and cost considerations.

The shaft 13 is mounted for rotating motion about a central longitudinal axis AA. The shaft 13 includes a driven section 18 and a mounting section 19. The driven section 18 is connected to drive means 20 at the end thereof remote from the mounting section by any suitable connectors, such as heavy duty threaded fasteners 21, while a seal 22 is applied between the facing surfaces of the mounting section and the drive means.

The drive means 20 can take any suitable form and the means shown in FIG. 4A is a shaft that may be driven by a suitable engine or motor. The drive means 20 is mounted within the housing 14 by bearings 23, which are tapered roller bearings. The bearings 23 are mounted against a stepped section 24 of the drive means 20 and against a mount insert 25 which is also stepped at 26. The mount insert 25 is fixed by threaded connectors 27 to the housing 14 and fixed to the mount insert 25 by further threaded connectors 28 is a sealing cap 29 which seals against the drive means 20 by seals 30. The sealing cap 29 also locates the outer race 31 of the bearings 23 by engagement therewith at 32, while a threaded ring 33 locates the inner race 34.

Figure 1:
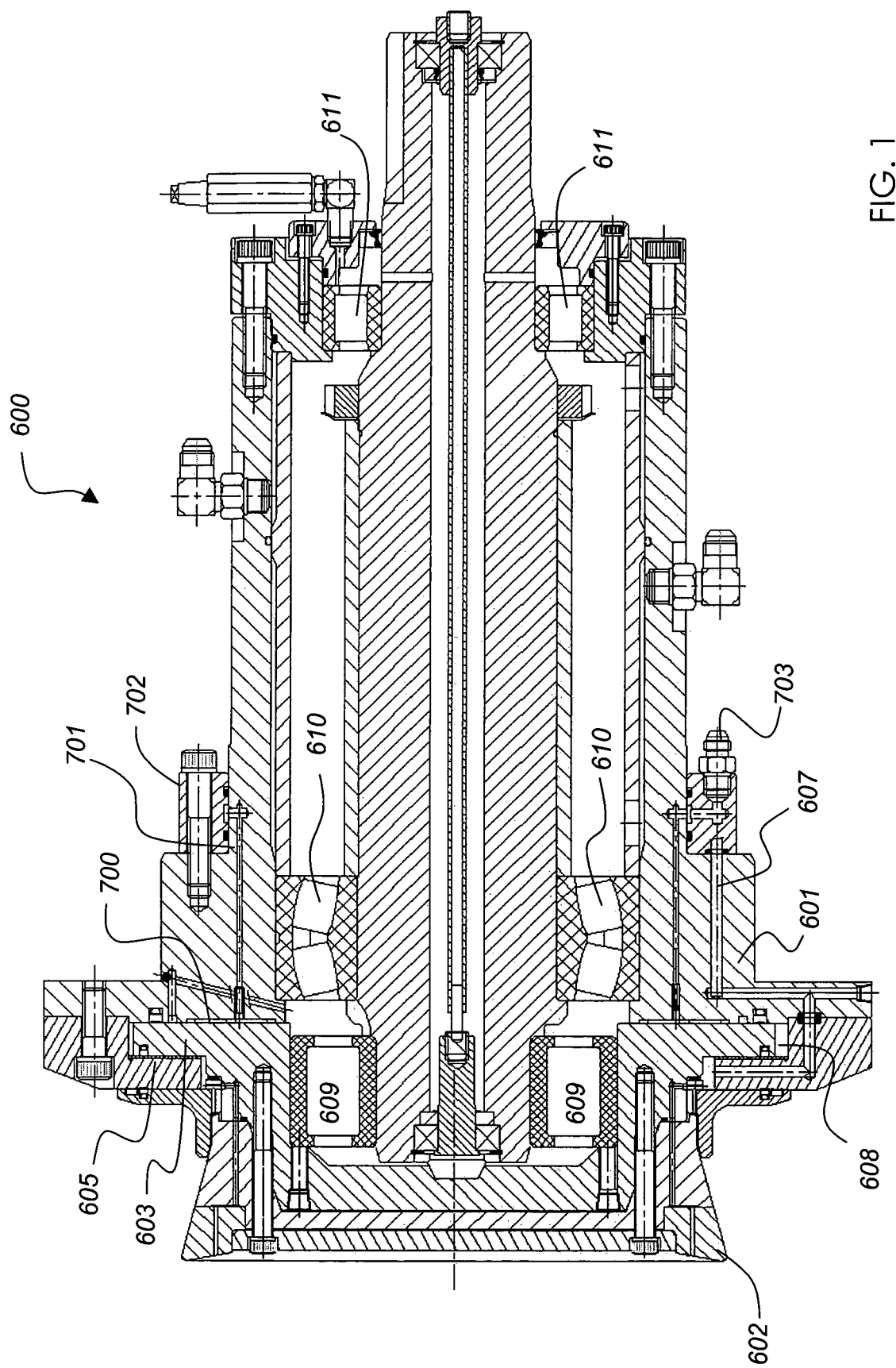
FIG. 1 is a cross sectional elevation through an oscillating disc cutter incorporating the present invention.

The mounting section 19 is provided for mounting of the disc cutter 12 and is offset from the axis AA of the driven section 18. In this particular embodiment, the mounting section is also angularly offset from axis AA. The axis BB of the mounting section 19 is shown in FIG. 1 and it can be seen that the offset angle α is in the order of a few degrees only. The magnitude of the offset between axis AA and BB determines the size of the oscillating movement of the disc cutter 12 whilst the magnitude of the angle α determines the degree of nutating movement. In other embodiments, the axes AA and BB may be offset parallel such that the angle α is zero. Such a configuration provides only oscillation and no nutation.

The disc cutter 12 includes an outer cutting disc 35 that is mounted on a mounting head 36 by suitable connecting means, such as threaded connectors 37. The outer cutting disc 35 includes a plurality of tungsten carbide cutting bits 38 which are fitted to the cutting disc in any suitable manner. Alternatively, a tungsten carbide ring could be employed. The outer cutting disc can be removed from the cutting device for replacement or reconditioning, by removing the connectors 37.

The disc cutter 12 is rotatably mounted on the mounting section 19 of the mounting shaft 13. The disc cutter 12 is mounted by a tapered roller bearing 39, that is located by a step 40 and a wall 41 of the mounting head 36. An inclined surface 42 of the mounting head 36 is disposed closely adjacent a surface 43 of a mounting insert 44. The surfaces 42 and 43 are spaced apart with minimum clearance to allow relative rotating movement therebetween and in this nutating embodiment, the surfaces have a spherical curvature, the centre of which is at the intersection of the axes AA and BB.

The disc cutter 12 is rotatably mounted to the mounting section 19 of the mounting shaft 13 by the tapered roller bearing 39 and by a further tapered roller bearing 53. The bearing 53 is far smaller than the bearing 39 for the reason that the large bearing 39 is aligned directly in the load path of the disc cutter and thus is subject to the majority of the cutter load. The smaller bearing 53 is provided to pre-load the bearing 39.

Figure 4C:
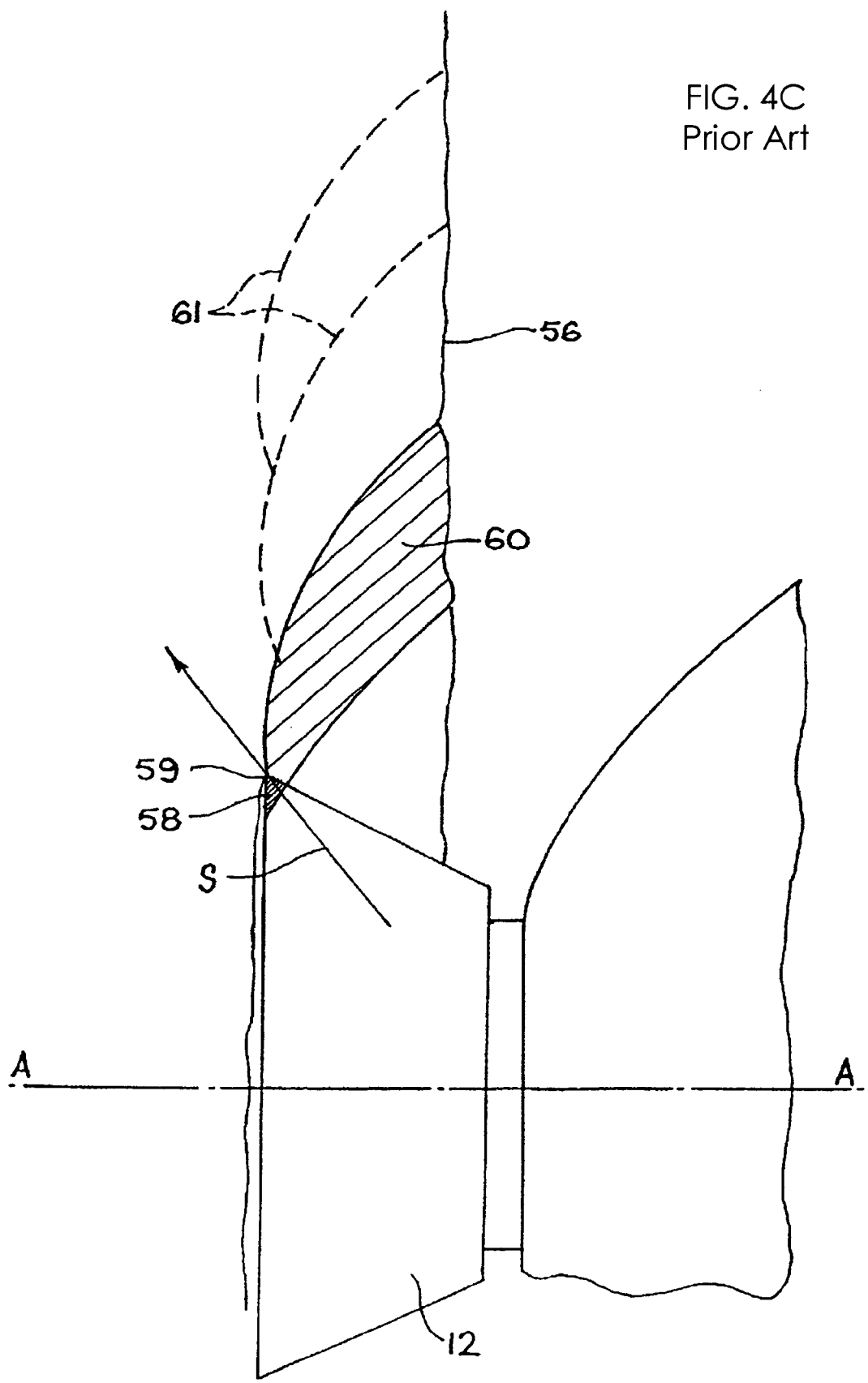
FIG. 4C is a reproduction of FIG. 3 from WO 00/46486 and is a schematic view of the action of the cutting device in excavating a rock face.

The oscillating movement of the disc cutter applies an impact load to the rock surface under attack, that causes tensile failure of the rock. With reference to FIG. 4C, it can be seen that the motion of the disc cutter 12 brings the cutting tip or edge 58 into engagement under the oscillating movement at point 59 of the rock 56. Such oscillating movement results in travel of the disc cutter 12 in a direction substantially perpendicular to the axis AA. Future chips are defined by the dotted lines 61. The action of the disc cutter 12 against the under face 59 is similar to that of a chisel in developing tensile stresses in a brittle material, such as rock, which is caused effectively to fail in tension.

The direction S of impact of the disc cutter against the rock under face 59 is reacted through the bearing 39 and the direction of the reaction force is substantially along a line extending through the bearing 39 and the smaller bearing 53.

The mass of the disc cutter is relatively much smaller than the mass provided for load absorption purposes. The load exerted on the disc cutter when it engages a rock surface under the oscillating/nutating movement, is reacted by the inertia of the large mass, rather than by the support structure.

Figure 2:
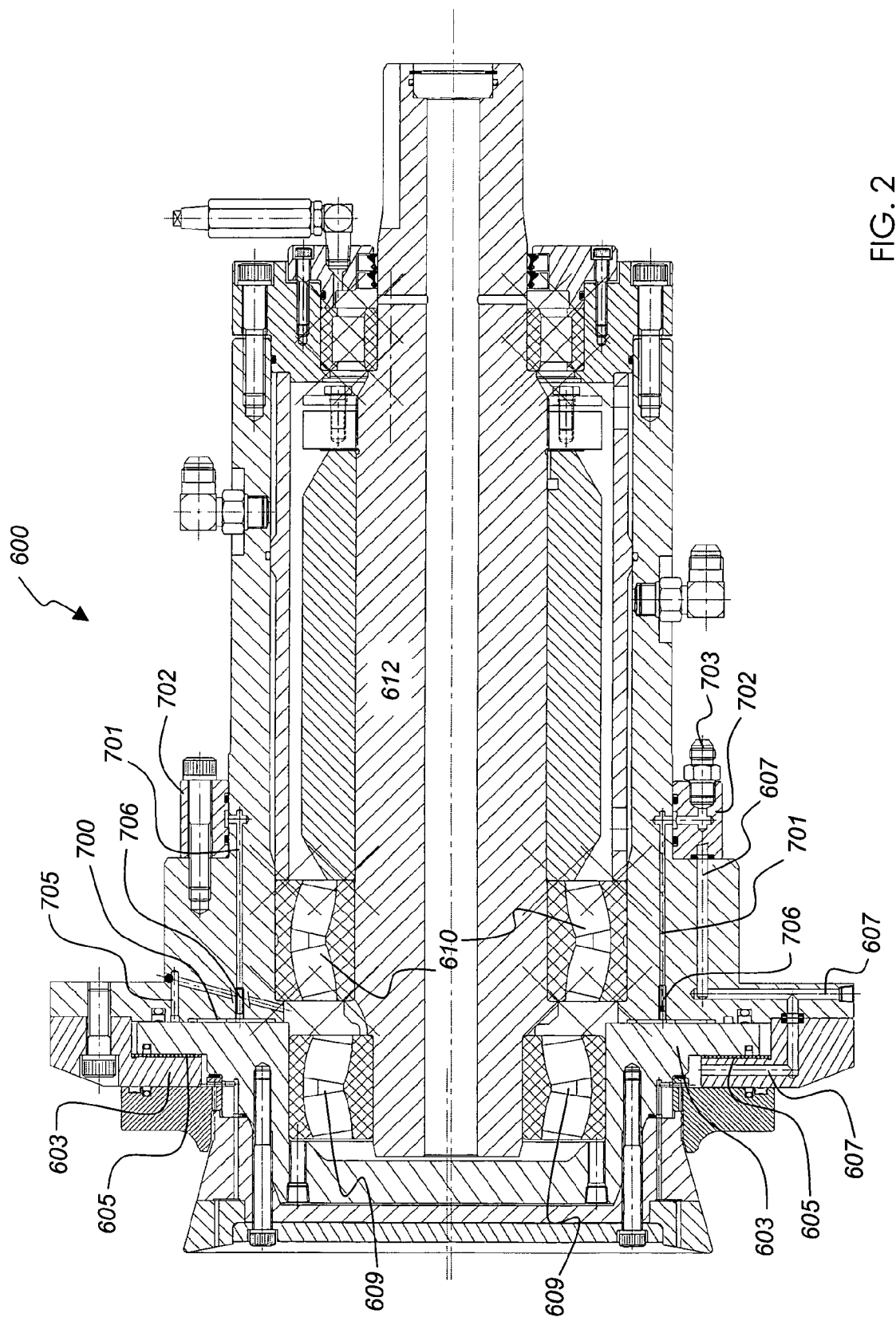
FIG. 2 is cross sectional view of a variation of the disc cutter shown in FIG. 1.
Figure 5:
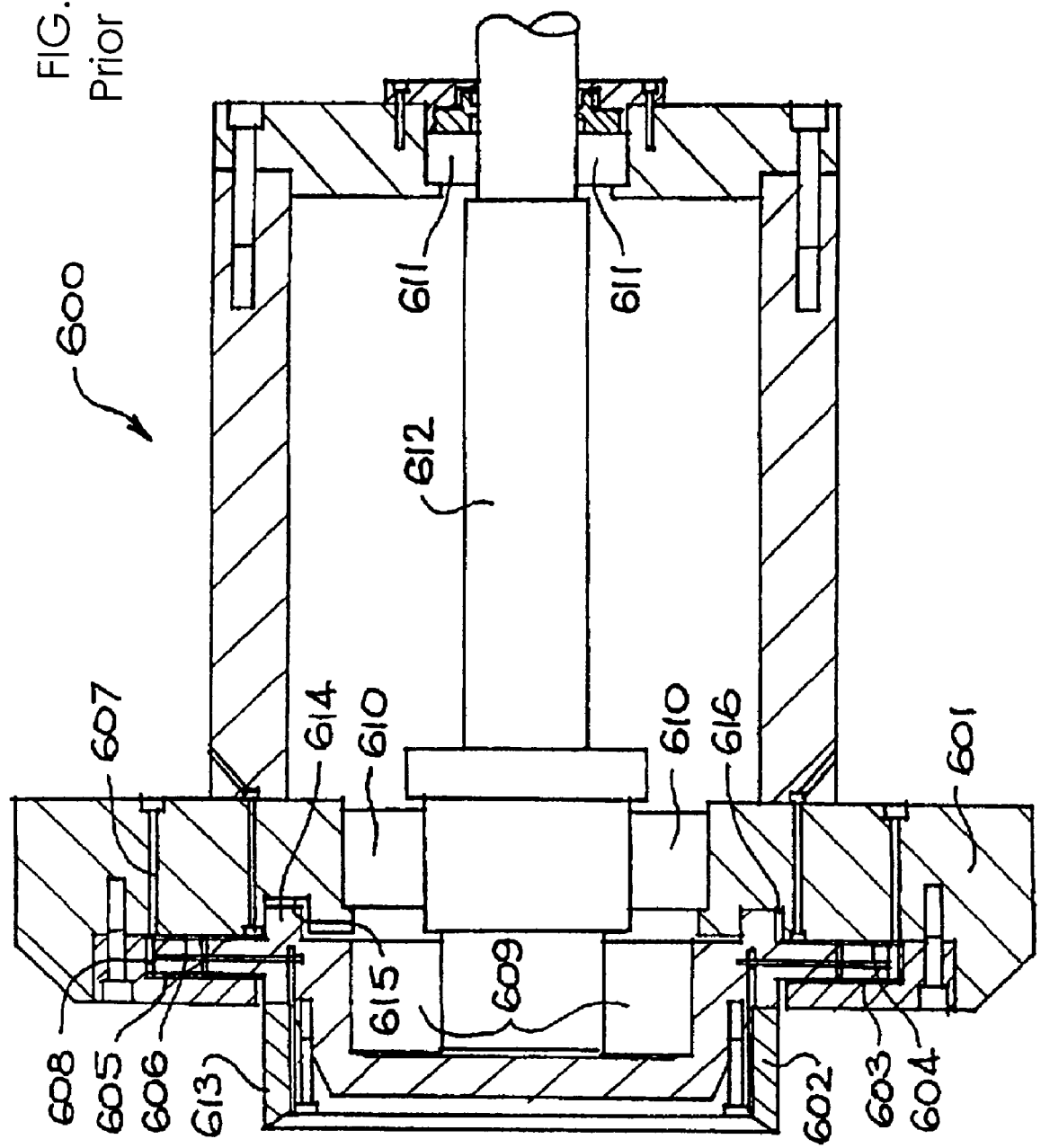
FIG. 5 is a reproduction of FIG. 7 from WO 00/46486 and shows a part cross-sectional view of an oscillating disc cutting device.

The oscillating disc cutter of the present invention is generally similar in configuration to that described above. More particularly, the disc cutter shown in FIGS. 1 and 2 is generally similar in configuration to that shown in FIG. 7 of international patent specification WO 00/46486, and reproduced here as FIG. 5. Like numbers refer to the components in that drawing as described in the description of the international patent specification.

Instead of the bearings 605 and 606 being water lubricated, only bearing 605 in the present invention is water lubricated. Bearing 606 is replaced by a hydrostatic bearing 700 supplied with high pressure oil through an annular passageway 701 inside a demountable ring 702, to which oil is supplied under pressure via nipple 703. The bearing 700 contains pockets 800 in the normal manner of hydrostatic bearings.

Figure 3B:
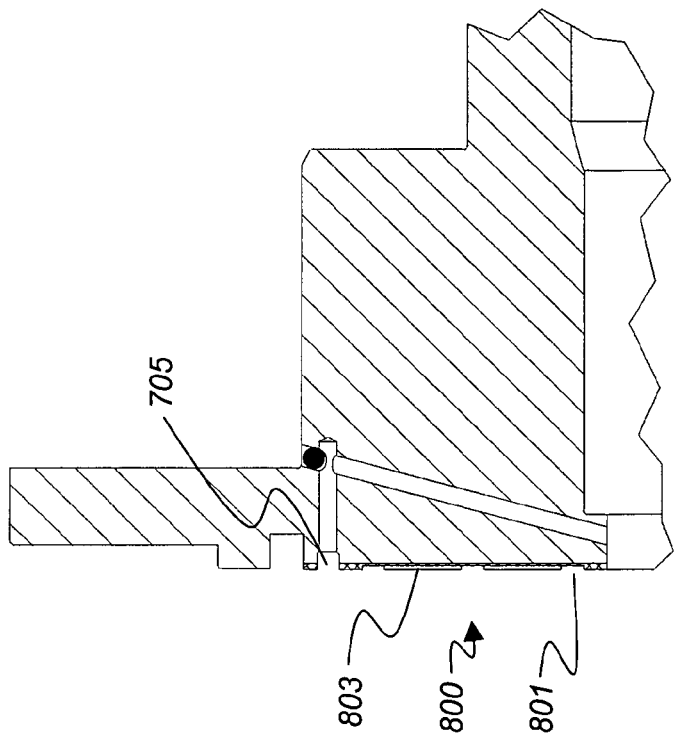
FIG. 3B is cross sectional view of the bearing face shown in FIG. 3A.
Figure 3A:
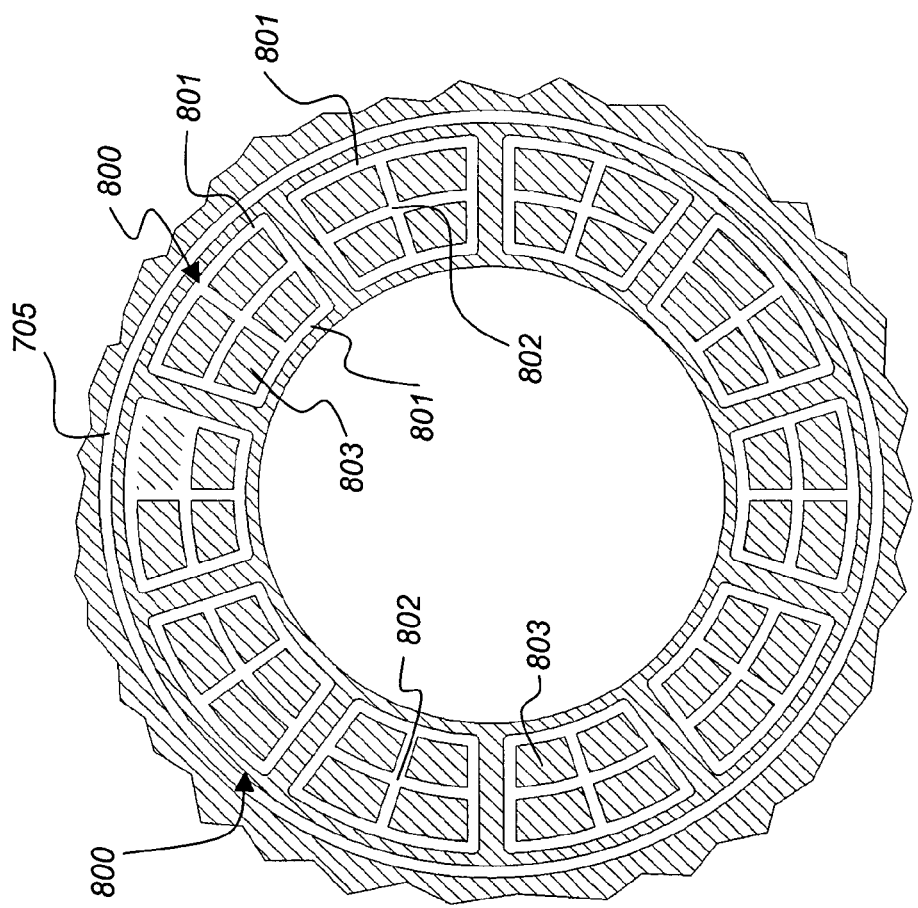
FIG. 3A is a partial view of a hydrostatic bearing face in accordance with the invention.

As can clearly be seen in FIG. 3A, these pockets may be in the form of a concentric grid pattern on the casing body opposing the disc 603, however, in alternative embodiments they may take on any form as is known in the art of hydrostatic bearings. In this embodiment there are ten pockets 800 evenly disposed in a circular array around the bearing. Each pocket's extremity is defined by a peripheral groove 801. A further oil channel groove in the form of a cross 802 dissects each pocket into four lands 803. Referring to FIG. 3B, these lands are at substantially the same height as the bearing surface between the pockets. Many hydrostatic bearings do not include these lands and the pockets are merely depressions in the bearing surface. However, in this embodiment, the lands effectively function to reduce the clearance gap between the bearing surfaces over a greater area thereby increasing the shear in the oil and enhancing the viscous drag characteristics of the bearing.

Oil is feed into the centre of each cross through a respective flow control orifice 706. Each respective orifice regulates the oil in each of the pockets of the bearing as is common in hydrostatic bearings.

Referring to FIG. 2, oil exiting the bearing is able to seep either directly into the body of the device between bearings 609 and 610 or into outer drain channel 705 at the periphery of the bearing.

Providing a set minimum load on the hydrostatic bearing is fluid bearing 605. This fluid bearing maybe considered simply as a pressurised annulus, however, is referred to throughout as a fluid lubricated bearing. The fluid bearing surfaces include an annular plate portion of the disc 603 and a corresponding portion of the cutter housing opposing the annular plate. These bearing surfaces are separated by an annular gap into which water is introduced at pressure through a series of passageways 607. A hose and hose fittings (not shown) may be used to transport pressurised water from a pressure pump (not shown). In this embodiment the water is en-route to the cooling jets for the cutting edge of the cutter however, in other embodiments, separate cooling water and bearing water systems may be used. In still further embodiments, different fluids may be used for cooling and pressurizing the fluid bearing.

The pressurised water provides a force on the plate thereby maintaining clearance between the bearing surfaces and providing an opposing force to the hydrostatic bearing. It will be appreciated that by regulating the pressure of the water, the magnitude of opposing force may also be regulated. Accordingly, by carefully controlling the water pressure in the fluid bearing and the oil pressure in the hydrostatic bearing, the clearance between the faces of the hydrostatic bearing can be set.

It will also be appreciated that the fluid bearing allows for a minute amount of axial yaw if the cutter head is differentially loaded. Such differential loading is accommodated and resisted by the hydrostatic bearing.

The fluid bearing surfaces may be covered with an antifriction material, as a safety measure should the bearing surfaces contact, for instance, as a result of failed water supply or during transport.

Typical values for the oil pressure supplied to the hydrostatic bearing and water pressure supplied to the fluid bearing are 14,000 kPa and 800 kPa respectively.

In operation, the cutter is powered by a 2-pole induction motor which, with a power supply at 50 Hz, rotates the dive shaft 612 at a speed of around 3000 rpm. Of course, alternative power supplies and a range of cutting speeds may be used.

However, it will be appreciated that drag inherent in the fluid and hydrostatic bearings provides a balancing torque to counter the rotation of the disc. By carefully selecting an appropriate pressure level in the fluid bearing, the clearance between the faces of the hydrostatic bearing are such that the rate of shear of the oil will rise with increasing speed of the disc. The friction developed due to the shear in the oil balances the rotation causing torque thereby limiting the free running speed of the disc to a desired value.

It will be appreciated that as well as rotation speed and clearance in the hydrostatic bearing, the frictional forces developed will also depend upon the design of the hydrostatic bearing surfaces and oil pockets and viscosity of the oil used. In turn, oil temperature will affect oil viscosity and therefore bearing performance. In this embodiment, standard hydraulic fluid is used however, other appropriate oils may be used as a replacement. The relationship between the viscosity of the oil selected and temperature is critical when selecting the oil.

Accordingly, the pressure of water supplied to the water lubricated bearing, the oil type, and the oil viscosity, temperature and pressure in the hydrostatic bearing are all carefully selected and controlled where appropriate to ensure correct function of the bearing and to avoid damage to the parts. In this regard the oil is passed through a heat exchanger of sufficient capacity to control the oil temperature.

An additional retardation force may be applied by drag inherent in the fluid bearing. Disengaging the cutter from the rock face reduces the axial load on the hydrostatic bearing which in turn causes the disc 603 to be forced closer to the water lubricated bearing surface 605. This may provide for an increase in drag thereby preventing the disc 603, to which the disc cutter 602 is bolted, from rotating at a high speed when the cutter is not engaging the rock face.

In this embodiment, the free running speed is selected to be about 30-40 rpm. While this is in the reverse direction to the operational speed, the difference is small enough to prevent damage and substantial wear to the cutter disc. However, in alternative embodiments, the parameters of the system may be selected to provide for virtually any free running speed desired in the direction of the shaft.

Accordingly, the drag in each axial bearing combines to eliminate the need for the gear arrangement 616 referred to in the description of FIG. 7 in international patent specification WO 00/46486.

In alternative embodiments of the invention, other types of axial load bearings known in the art may replace the hydrostatic and fluid lubricated bearings. For instance, the hydrostatic bearing may be replaced by a Michell bearing and the fluid lubricated bearing may take to form of a mechanical, hydrodynamic, electromagnetic or other type of bearing able to withstand and/or provide an axial load. In such embodiments, one or other of the bearings may have a more significant effect in controlling the speed of the cutter disc when free spinning.

Although the cutting device is of the type generally described in WO 00/46486, it will be appreciated that various types of similar cutting devices may be used, with or without the nutating feature described in that patent specification.

It will be appreciated that the invention provides an effective means for limiting the speed of the cutter disc when in free running mode without the use of mechanical parts which are comparatively higher wearing.

Thus, in essence, the water lubricated bearing 605 and the hydrostatic bearing function as drag brakes on the rotation of the disc 603 and hence of the cutter 602.

Although the invention has been described with reference to specific examples it will be appreciated by those skilled in the art that the invention may be embodied in many other forms.

The invention claimed is:
1. An oscillating disc cutter including:
a housing;
a cutting disc; and
a drive mechanism, the drive mechanism including:
 a drive shaft mounted within said housing for a bearing for rotation about a longitudinal shaft rotation axis with respect to said housing, said shaft including a driven section and an offset mounting section fixed to said driven section, said mounting section including a mounting axis parallel to and spaced from said shaft rotation axis;
 wherein said cutting disc is rotationally mounted to said mounting section about said mounting axis such that rotation of said shaft induces lateral eccentric oscillation of the cutting disc; and
 a radial bearing disposed between the mounting section of the drive shaft and the cutting disc to permit relative and generally free rotation of the cutting disc on the drive shaft;
 the cutter further including a first axial friction inducing bearing disposed directly between the disc and said housing to transmit axial loads exerted on the disc to the housing while accommodating generally a free rotation of the cutting disc with respect to said housing when operatively engaged and wherein said friction bearing induces a rotational drag between said disc and said housing thereby limiting rotational speed of the cutting disc when free running to an angular velocity below that of the drive shaft.

2. An oscillating disc cutter according to claim 1 further including a second bearing to induce a predetermined axial load in the first bearing.

3. An oscillating disc cutter according to claim 2 wherein the second bearing substantially reacts the axial forces induced by the first bearing.

4. An oscillating disc cutter according to claim 2 wherein the first bearing is of relatively higher friction, and the second bearing is of relatively lower friction.

5. An oscillating disc cutter according to claim 2 wherein the first bearing is a hydrostatic bearing.

6. An oscillating disc cutter according to claim 5 wherein the hydrostatic bearing substantially reacts the axial cutting forces in the operative cutting mode.

7. An oscillating disc cutter according to claim 6 wherein the hydrostatic bearing is oil operated.

8. An oscillating disc cutter according to claim 7 wherein the second bearing is a pressurized fluid lubricated bearing.

9. An oscillating disc cutter according to claim 8 wherein pressure in the fluid lubricated bearing is maintained at a level such that a predetermined maximum running clearance in the hydrostatic bearing is maintained thereby inducing shear forces in the oil of the hydrostatic bearing.

10. An oscillating disc cutter according to claim 9 wherein the shear forces cause rotational drag in the bearing thereby limiting the rotational speed of the cutting disc when free running.

11. An oscillating disc cutter according to claim 8 wherein the fluid lubricated bearing is pressurized with water.

12. An oscillating disc cutter according to claim 11 wherein the fluid lubricated bearing is the form of a water-pressurized annulus.

13. An oscillating disc cutter according to claim 2 wherein the second bearing is a fluid lubricated bearing.

14. An oscillating disc cutter according to claim 1 wherein the limited rotational speed of the cutting disc when free running is 0 to 1500 rpm.

15. An oscillating disc cutter according to claim 1 wherein the limited rotational speed of the cutting disc when free running is 0 to 750 rpm.

16. An oscillating disc cutter according to claim 1 wherein the limited rotational speed of the cutting disc when free running is 0 to 100 rpm.

17. An oscillating disc cutter according to claim 1 wherein the cutting disc is maintained at rotational speed that is lower than a speed of said drive shaft, even if there is no cutting load on the cutting disc.

18. An oscillating disc cutter according to claim 1 wherein said rotational drag is predetermined in magnitude.

19. An oscillating disc cutter according to claim 18 wherein said rotational drag is controllable.

20. An oscillating disc cutter according to claim 1 wherein said rotational drag is controllable.

* * * * *